United States Patent
Carroll et al.

(10) Patent No.: US 7,502,775 B2
(45) Date of Patent: Mar. 10, 2009

(54) PROVIDING COST MODEL DATA FOR TUNING OF QUERY CACHE MEMORY IN DATABASES

(75) Inventors: Matthew James Carroll, Toronto (CA); Christian Marcelo Garcia-Arellano, Richmond Hill (CA); Sam Sampson Lightstone, Toronto (CA); Michael Joshua Snowbell, Thornhill (CA); Adam J. Storm, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 11/278,373

(22) Filed: Mar. 31, 2006

(65) Prior Publication Data

US 2007/0233638 A1  Oct. 4, 2007

(51) Int. Cl.
*G06F 17/30* (2006.01)
*G06F 12/00* (2006.01)

(52) U.S. Cl. .................. 707/2; 707/1; 707/3; 707/205; 711/119; 711/126; 711/133; 709/213

(58) Field of Classification Search ............ 707/2, 707/1, 3, 205
See application file for complete search history.

(56) References Cited

U.S. PATENT DOCUMENTS

| | | | |
|---|---|---|---|
| 5,668,987 A | | 9/1997 | Schneider |
| 5,822,749 A * | | 10/1998 | Agarwal ............... 707/2 |
| 6,282,613 B1 * | | 8/2001 | Hsu et al. ............. 711/118 |
| 6,301,641 B1 * | | 10/2001 | Verhoeven et al. ...... 711/118 |
| 6,351,724 B1 * | | 2/2002 | Klassen et al. .......... 702/186 |
| 6,446,062 B1 * | | 9/2002 | Levine et al. ............. 707/3 |
| 6,493,810 B1 * | | 12/2002 | Pang et al. ............ 711/170 |
| 6,691,080 B1 * | | 2/2004 | Tachibana ............... 703/19 |
| 6,742,084 B1 * | | 5/2004 | Defouw et al. .......... 711/133 |
| 6,952,664 B1 * | | 10/2005 | Lahiri et al. ............. 703/14 |
| 7,284,093 B2 * | | 10/2007 | Presler-Marshall ..... 711/126 |
| 2004/0083208 A1 * | | 4/2004 | Kroening et al. .......... 707/3 |
| 2004/0193827 A1 * | | 9/2004 | Mogi et al. ............. 711/170 |
| 2005/0071599 A1 | | 3/2005 | Modha et al. |
| 2005/0160225 A1 | | 7/2005 | Presler-Marshall |
| 2005/0273310 A1 * | | 12/2005 | Newburn ................ 703/17 |
| 2006/0098675 A1 * | | 5/2006 | Okuno .................. 370/412 |
| 2006/0294192 A1 * | | 12/2006 | Mao et al. .............. 709/213 |
| 2007/0186045 A1 * | | 8/2007 | Shannon et al. .......... 711/133 |
| 2007/0203890 A1 * | | 8/2007 | Sareen et al. ............. 707/3 |

* cited by examiner

*Primary Examiner*—Don Wong
*Assistant Examiner*—Thanh-Ha Dang
(74) *Attorney, Agent, or Firm*—Sawyer Law Group LLP

(57) ABSTRACT

Providing cost model data for tuning query cache memory size in database systems. In one aspect, a query is received, and a query cache is checked for a stored query matching the received query. In response to a cache miss occurring, a token representing the received query is generated and checked for matching a token stored in a simulation area, each stored token representing a query object previously evicted from the query cache. A processing time saved by an avoidance of the cache miss is determined, and a cache size needed to avoid the cache miss is determined only when the generated token matches a stored token, by summing sizes of all query objects represented by the stored tokens. Each stored token is included in a stub that also includes the size of the represented query object and an identification number indicating a stored order.

12 Claims, 4 Drawing Sheets

PROVIDING COST MODEL DATA FOR TUNING OF QUERY CACHE MEMORY IN DATABASES

FIELD OF THE INVENTION

The present invention relates to computer database systems, and more particularly to the tuning of query cache memory in database systems.

BACKGROUND OF THE INVENTION

Database management systems (DBMS's) store extensive amounts of organized information for access by users of the systems. In a database system environment, the system responds to specific queries from the user as to which data from the database to examine, retrieve and/or present. Typically, users provide queries in a particular syntax of a particular database language that is used by the system, such as Structured Query Language (SQL) format.

DBMS's utilize computer main memory for a variety of tasks. Important tasks include sorting and caching, including caching data pages (i.e., the tables of the database), as well as caching queries. Queries are stored in a query cache to speed up query processing. A query cache (e.g., "package cache" in the DB2 product from IBM Corporation) typically stores the SQL text for each query issued to the DBMS, as well as an executable form of the query which is the result of compiling the query. When a query is issued, the query cache is searched to determine if the DBMS has the executable form of the query already stored in the cache. If the executable form is already present, this indicates that the same query was previously received by the DBMS and compiled into its executable form at that time. Thus, the expensive and time-intensive process of compiling the query is avoided at later times if the query is already available in the query cache. The purpose of the query cache is to avoid incurring this cost as much as possible.

The storage capacity (size) of the query cache determines how many queries can be stored and thus determines how likely a query will be found in the cache. When the size of the query cache is exceeded, older queries are typically removed from the cache to make room for newer queries. In general, the smaller the query cache, the greater the amount of cache "misses" will occur, in which the query is not found, and compiling of the query must therefore be performed. However, if the size of the query cache is too large, then valuable memory storage would be wastefully allocated when a smaller cache size would be adequate, and when a different memory area of the system may be in greater need of the memory storage.

Thus, setting a proper cache size is an important task in a DBMS. In prior systems, setting the size of the query cache was a manual task forced upon a database administrator. Typically, the administrator would set the query cache one time initially and not make frequent updates. For example, there are implementations that set the query cache size based on a program asking the user initially a set of questions and using a heuristic based on the answers to the questions to set the query cache size. A problem with such solutions is that they do not adapt to changes occurring in the database system, and they are based on equations which are only rough approximations of query size and performance of the system. Other solutions are likewise inflexible, requiring that simulations be run at particular pre-designated cache sizes to find a more optimal cache size for the system.

Accordingly, what is needed is the ability to provide accurate estimations as to how much processing time is saved and how much processing time it will cost for tuning a query cache to any desired size, and at any time over the actual operation of a database system, to assist the tuning of the size of that query cache. The present invention addresses such a need.

SUMMARY OF THE INVENTION

The inventions of the present application relate to providing cost model data for tuning query cache memory size in database systems. In one aspect of the invention, a method for providing cost data for tuning a size of a query cache in a database system includes receiving a query, and checking a query cache to determine whether a stored query matches the received query. In response to a cache miss occurring due to no stored query matching the received query, a token is generated from the received query, the token representing the received query, and the generated token is checked whether it matches a token stored in a simulation area of storage. Tokens are stored in the simulation area of storage, each of the tokens representing a query object that was previously evicted from the query cache. Also in response to the cache miss, a processing time saved by an avoidance of the cache miss is determined, and a cache size needed to avoid the cache miss is determined. The determining of the cache size needed to avoid the cache miss is performed only when the generated token matches a token stored in the simulation area of storage. The cache size is determined by summing sizes of all the query objects represented by the tokens stored in the simulation area of storage, where the summed query objects are a same age or older than the query object represented by the matching token. Each token stored in the simulation area of storage is included in a sub that also includes the size of the query object represented by the token, and an identification number indicating an order in which the token was stored in the simulation area of storage. A similar aspect of the invention is provided for a computer program product comprising a computer readable medium including program instructions for implementing similar features.

In another aspect of the invention, a system for providing cost data for tuning a size of a query cache in a database system includes a query cache provided in memory of the database system, a simulation area of storage provided in the memory of the database system, and at least one processor in communication with the query cache and the simulation area. The processor is operative to check the query cache to determine whether a stored query matches a received query. In response to a cache miss occurring due to no stored query matching the received query, the at least one processor generates a token from the received query, where the token represents the received query and checking whether the generated token matches a token stored in the simulation area of storage. A plurality of tokens are stored in the simulation area of storage, each of the tokens representing a query object that was previously evicted from the query cache. The processor also determines a processing time saved by an avoidance of the cache miss, and determines a cache size needed to avoid the cache miss. The determining of the cache size needed to avoid the cache miss performed only when the generated token matches a token stored in the simulation area of storage, where the cache size is determined by summing sizes of all the query objects represented by the tokens stored in the simulation area of storage. The summed query objects are a same age or older than the query object represented by the matching token. Each token stored in the simulation area of storage is included in a stub that also includes the size of the query object represented by the token, and an identification number indicating an order in which the token was stored in the simulation area of storage.

The present inventions allow cost data related to query cache size and processing time to be accurately determined, this data to be used for tuning the query cache of a database system to any desired size. The inventions also allow such cost data to be determined based on actual use of a database system, rather than projected use.

BRIEF DESCRIPTION OF THE FIGURES

FIG. 2b is a diagrammatic illustration of a stub of the present invention for storing in the simulation area of FIG. 2a;

DETAILED DESCRIPTION

Figure 1:
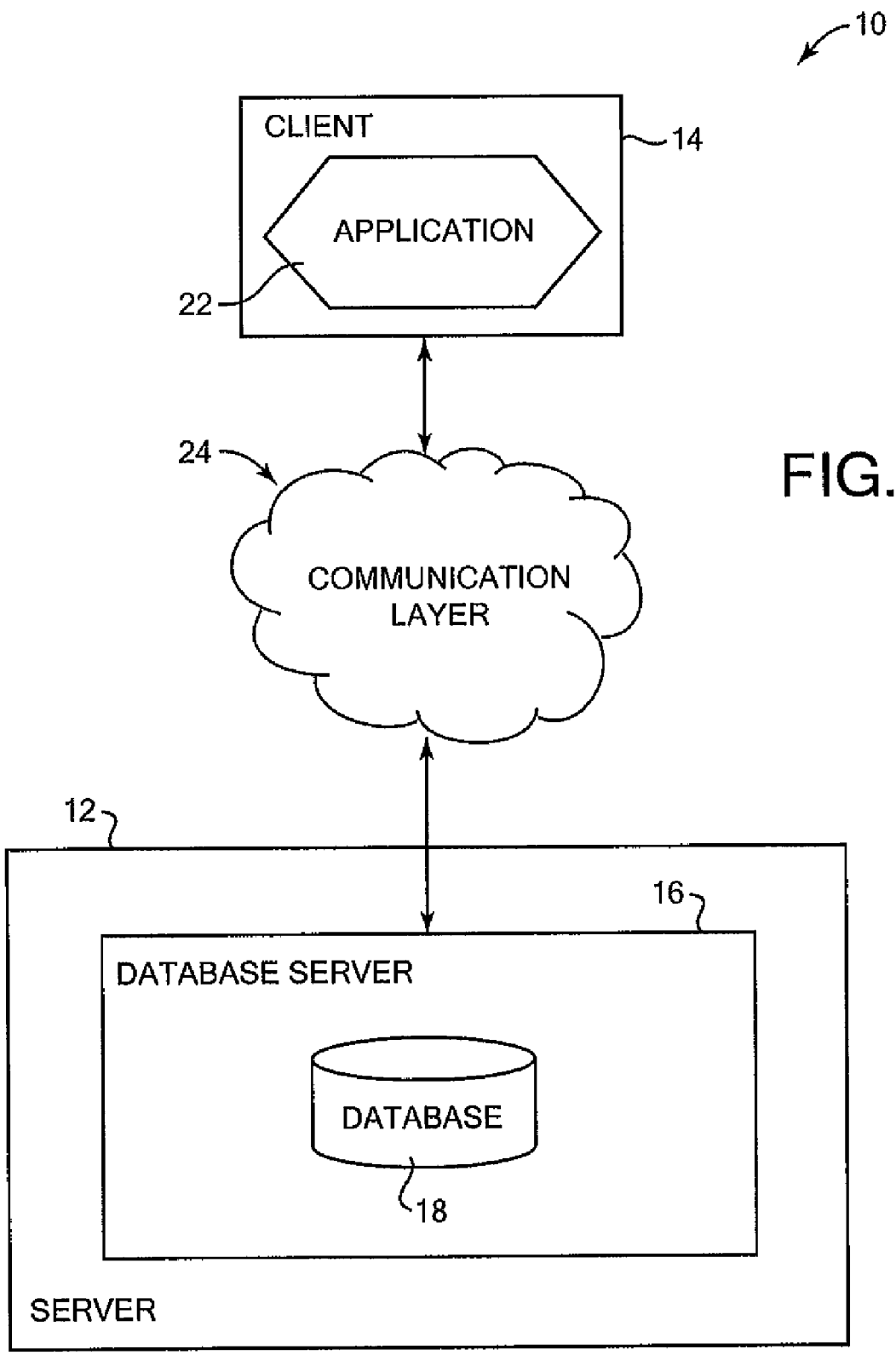
FIG. 1 is a block diagram illustrating a system suitable for use with the present invention.

The present invention relates to computer database systems, and more particularly to the tuning of query cache memory in database systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the system implementations usable with the present invention can take a number of different forms. The present invention will also be described in the context of particular methods having certain steps. However, the method and system operate effectively for other methods having different and/or additional steps not inconsistent with the present invention.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

To more particularly describe the features of the present invention, please refer to FIGS. 1-4b in conjunction with the discussion below.

FIG. 1 is a block diagram illustrating a system 10 suitable for use with the present invention. System 10 includes exemplary components, such as a server 12 and a client 14.

Server 12 is implemented as a computer system or electronic device. For example, the server 12 can be a mainframe computer, desktop computer, workstation, portable computer, or electronic device. One or more microprocessors and memory devices (not shown) control the operation of the server, including data manipulation, computation, input/output, and other typical functions. For example, the query cache and simulation area used in the present invention (as well as other caches, like a data page cache) can be implemented in memory of the server 12, or alternatively in other data storage, such as hard disk, and the functions of the invention can be provided by at least one processor of the server 12.

The server 12 includes one or more database servers 16, which are implemented on the server 12 and performs functions and operations specific to a database system. A database server 16 can include the necessary software to, for example, send and receive appropriate database commands and data, read and write data to a database, allocate space for and organize data, etc. For example, the database server 16 can be implemented based on a known standard, such as that for the DB2 product from IBM Corporation, or other database standards. The database server 16 can include the necessary program instructions and/or components to implement the present invention as described below with reference to FIG. 3.

One or more databases 18 are included in database server 16, where a database 18 is an entity that includes user data as well as information and functions needed to implement the data storage. The database server 16 organizes data in database 18 according to rules and structures as specified by the database creator and administrator. For example, the data can be organized into tables and table spaces. The storage of data in the database 18 is implemented using one or more storage devices, such as hard disks, magnetic tape, optical storage devices (CD, DVD, etc.), memory, or other types of storage media. In an alternate embodiment, the database 18 can be distributed among multiple computer systems or electronic devices, such as multiple servers 12.

Client 14 can be any suitable computer system or electronic device that allows a user (or program) to communicate with the server 12. The client 14 can implement an application 22, which can be a database interface application, for example. The database interface allows the user to input queries to the database server 16, to search for data stored in the database 18 that satisfies the queries, and return that data to the application 22. For example, user access can be provided to the data of the database 18 using a database language, such as Structured Query Language (SQL). In alternate embodiments, interface application 22 can be implemented on the server 12 to allow access to database server 16 for a user.

The communication between client 14 and server 12 (or application 22 and database server 16) is allowed over a communication layer 24, which can include transmission wires, wireless communication devices, internal circuits to the server 12, or any electronic communication medium and mechanism.

Figure 2A:
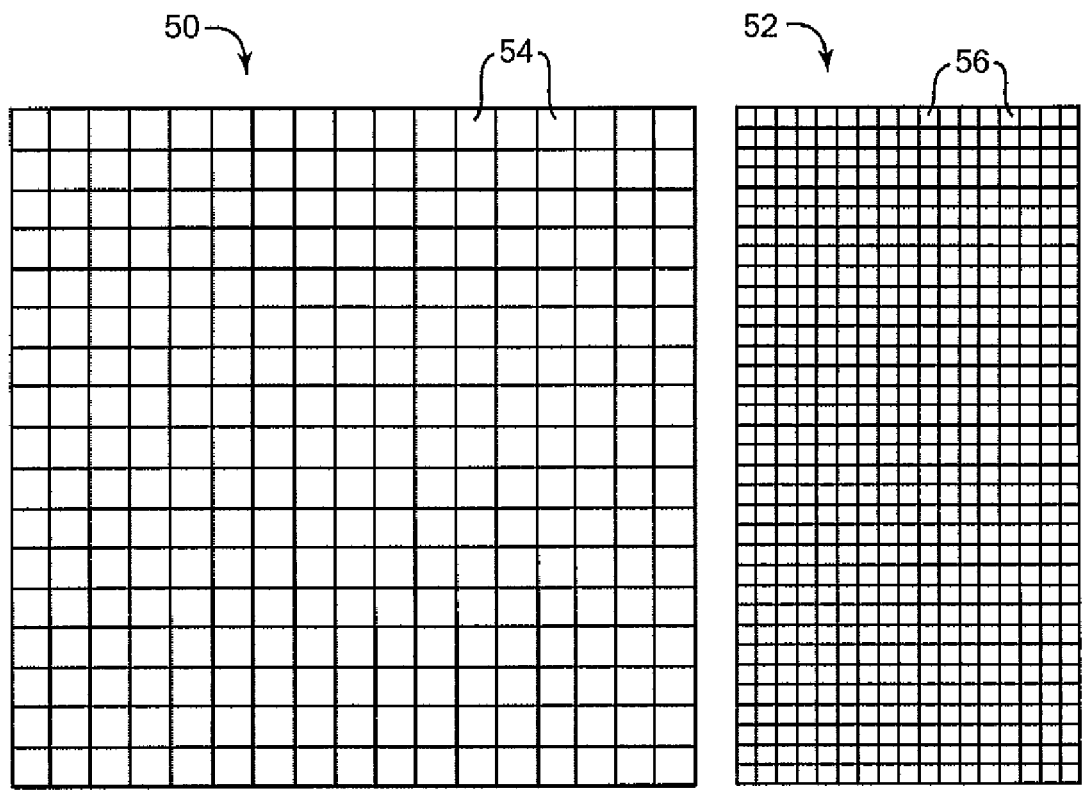
FIG. 2a is a diagrammatic illustration of a query cache and simulation area for use with the present invention.

FIG. 2a is a diagrammatic illustration of a query cache 50 and a simulation area 52 for use with the present invention. Query cache 50 is storage space allocated in memory of the database system 16 for storing queries. When a query is stored, it can be stored as a "query object" 54 in the cache 50, the query object 54 including the text query that was input (e.g., an SQL statement), and a compiled form of the query ("executable query", also known as a "section"). The executable query is in a form that can be executed by the database system, and can include many different optimizations to execute efficiently, as is well known to those of skill in the art. Other information can also be stored in the query object 54, such as one or more timestamps, e.g., when the query started and/or finished compiling, and/or a time value indicating how long the compilation took. Also, other information such as various configuration parameters, environmental factors, etc. can be stored in the query object 54. The query cache 50 stores a number of query objects 54 based on the size of the cache 50 and the size of each query object 54. The size of query objects 54 can vary based on the contents of the query instruction.

The simulation area 52 is an area in memory storage of database server 16 that is devoted to the storage of "stubs" 56 of the present invention. The simulation area 52 can be an allocated portion of memory (or other storage) of the system that is independent of the query cache 50, and, for example, can be in a separate area of memory or in an adjacent area of memory to the cache 50.

Figure 2B:
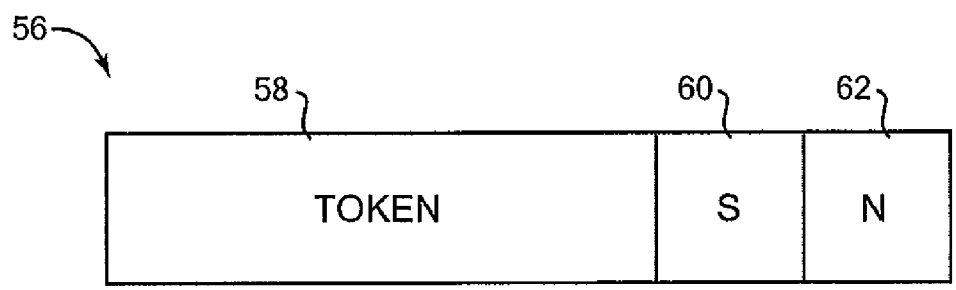

As shown in FIG. 2b, a stub 56 of the present invention includes a token 58, which is a representation of a query object 54 that takes much less storage space than the query object 54. In typical implementations, the simulation area 52 can be made much smaller than the query cache 50, since the stubs 56 require much smaller storage space. According to the present invention, tokens 58 are created and stored for query objects 54 that have been evicted from the query cache 50 to make room for new queries. The creation and use of tokens 58 is described in greater detail below with respect to FIG. 3.

A stub 56 also includes a size (S) parameter 60, which indicates the size of the query object 54 that was evicted from the query cache 50, which the token 58 of that stub 56 represents. Stub 56 additionally includes an identification number (N) 62, which is a number assigned to the stub 56 when it is stored in the simulation area and indicates a place in the order in which the stub 56 was inserted in the simulation area 52, i.e., the number N for a stub 56 indicates that it is the Nth stub to be inserted in the simulation area. The size parameter 60 and identification number 62 are used to determine the size that the cache 50 needs to be under certain circumstances, which is described in greater detail below with respect to FIG. 3.

Figure 3:
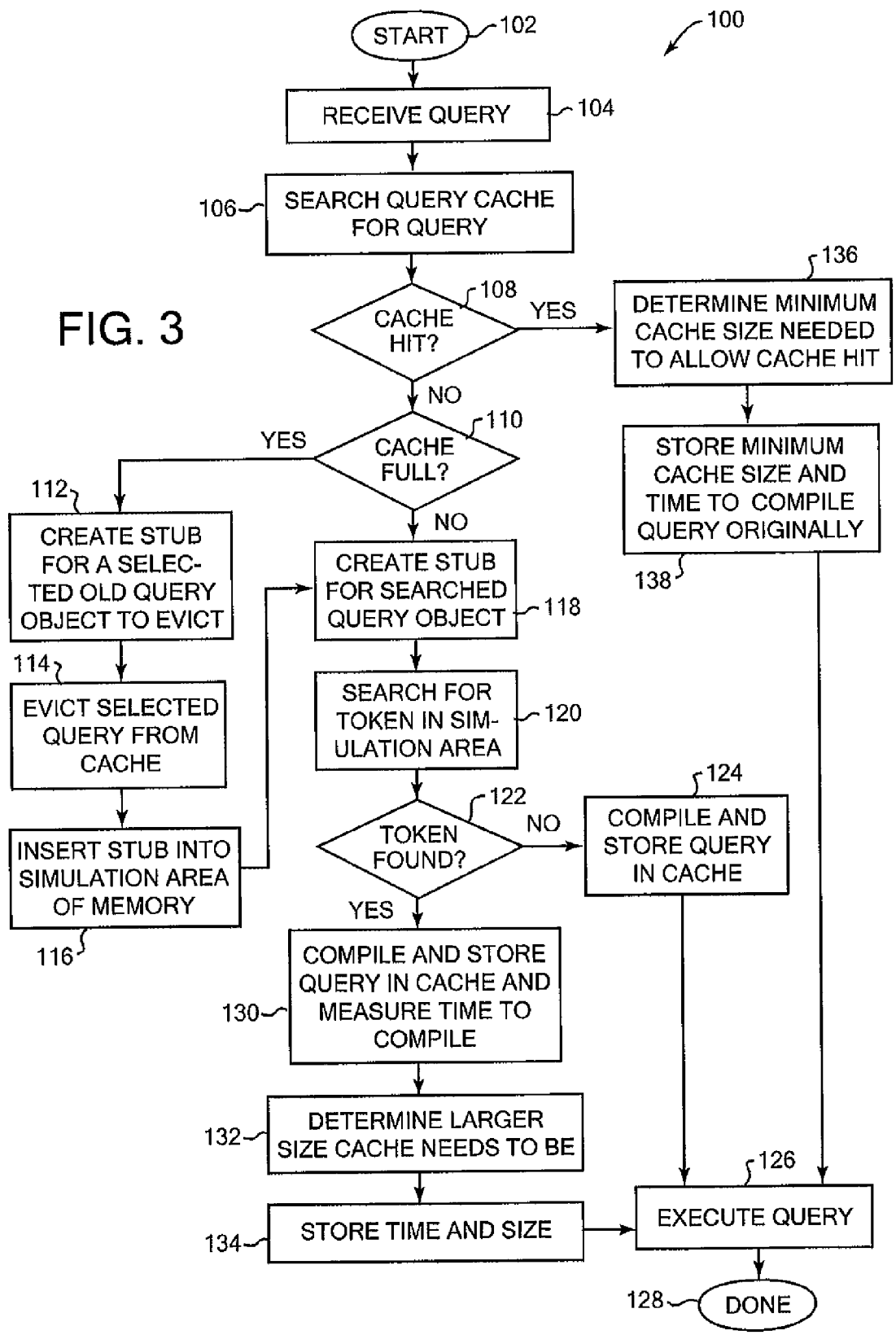
FIG. 3 is a flow diagram illustrating a method of the present invention for providing cost data for tuning the size of a query cache in a database system.

FIG. 3 is a flow diagram illustrating a method 100 of the present invention for providing time cost data for tuning the size of a query cache 50 in a database system. Method 100 can be implemented, for example, on the same computer or electronic device (or one of the computer systems or devices) that implements the database server 16 and database 18. Method 100 can be implemented by program instructions or code. Program instructions can be stored on a computer readable medium. Alternatively, the method 100 can be implemented in hardware (logic gates, etc.), or in a combination of hardware and software.

The method begins at 102, and in step 104, the process receives a query, which was originally input by a user (including a human user, or a different program or device). The query is in a standard format or language to allow it to be processed by the database system. For example, queries are commonly provided in SQL format.

In step 106, the process searches the query cache 50 for a stored query that is the same as the query received in step 104. Such a stored query, if present, would have been received at an earlier time and stored at that time in the cache 50. Typically, the process searches by comparing the text query statements in the cache 50 with the text in the received query. Alternatively, other information in the query objects 54 can also be searched to determine whether the received query is the same as a stored query.

In step 108, the process determines if there has been a cache hit or a cache miss. If the same query as the received query has been found stored in the query cache 50, it is a hit; otherwise it is a miss. If there is a cache hit, the process continues to step 136, described below. If there is a cache miss, the process continues to step 110, in which it is determined whether the query cache 50 has insufficient space to fit the received query in its storage area. If the query cache 50 has sufficient space, the process continues to step 118, described below.

If the query cache 50 is has sufficient space, the process continues to step 112, in which a stub 56 is created for a selected query object 54 stored in the cache 50, which will be evicted (purged) from the cache 50. The selected query object 54 for eviction can be any of the stored query objects 54, selected based on different criteria in different embodiments. One selection criterion is age: the oldest query object 54 is selected, i.e., the query object 54 that was executed the furthest in the past. This can be determined, for example, based on timestamp values stored in the query objects 54 in the cache. According to the present invention, a created stub 56 includes a token 58, a size parameter 60, and an identification number 62, as described above with reference to FIG. 2b.

The token 58 is a representation of the evicted query that requires much less storage space than the query object 54, and can be created using any of a variety of processes. The token generation process should be deterministic, to always provide the same token 58 from the same query; should provide a token 58 small relative to the size of the typical size of a query object 54; and, as much as possible, should provide a unique token 58 for each different query. For example, a cyclical redundancy check (CRC) can be performed on the textual part of the query to generate the resulting value as a token 58; for example, a 64-bit CRC can provide enough bits to handle the typical amount of tokens 58 that may be needed in many current database systems. Alternatively, the CRC can be provided based on the executable form of the query. Other embodiments can use other methods to generate a token 58, such as particular hash algorithms.

In step 114, the selected query object 54 is evicted from the query cache 50. In step 116, the stub 56 created in step 112 for the evicted query is inserted in the simulation area 52 of memory storage. The process then continues to step 118.

Step 118 is performed after query eviction in steps 112-116, or if the query cache 50 has insufficient space as determined in step 110. In step 118, the process creates a stub 56 for the received query object 54. As described above, the created stub 56 includes a token 58, a size parameter 60, and an identification number 62. In step 120, the process searches the simulation area 52 for a stored token 58 that is the same as the token 58 created in step 118 for the received query.

In step 122, the process determines whether the search for the token 58 in the simulation area 52 is successful. If not, the process continues to step 124, in which the received query is compiled and the query object 54 stored in the query cache 50 as normal (the time to compile the query can also be computed, similarly as in step 132, described below, for use in step 138). The process then continues to step 126 to execute the executable query as is well known to those of skill in the art, and the process is complete at 128. It should be noted that different processes or threads can perform the compilation and/or execution of the query, which can be the same or different from the process of the present invention for determining cost data for tuning the query cache size.

If a token 58 for the received query was matched in the simulation area 52 in step 122, then the process continues to step 130, in which the received query is compiled and its query object 54 is stored in the query cache 50. Furthermore, the processing time to compile the received query is also measured in this step. This can be performed, for example, by taking a time stamp t1 before the query is compiled, taking a time stamp t2 when the compilation is complete, and subtracting time t1 from time t2. In some alternate embodiments, the "processing time" measured here can be based on other operations. For example, some embodiments may have all queries pre-compiled and stored in data storage; the "processing time" in this case would be the measured I/O time needed to retrieve the pre-compiled query, rather than the time for compiling it directly. Thus, while the term "processing time" may usually be referred to herein as time to compile, this term can also refer to other processing operations needed to obtain a compiled form of the query.

In step 132, a larger size of the cache 50 is determined, this larger size being the size the cache 50 needs to be to avoid the cache miss that occurred. To avoid the miss, the query cache 50 would have to be large enough to accommodate the storage of the received query, so that this query would be available as a cached query when the query was received. In the described embodiment, this determination is made by using the simulation area 52 and the stored stub 56 that matched the received query. The size of the query cache 50 needed to avoid the cache miss is the current query cache size, plus the sum of the sizes S of all tokens 58 in the simulation area 52 that have an identification number 62 less than or equal to the identification number 62 N of the matching token 58. Many different optimizations can be used to approximate this sum. For example, one method is to order the stubs 56 in the simulation area 52 by their identification numbers 60 and traverse all stubs 56 in the simulation area 52, from lowest ID number to N, adding the size value S in each stub 56 to the total sum. Other methods can be used in other embodiments.

Figure 4A:
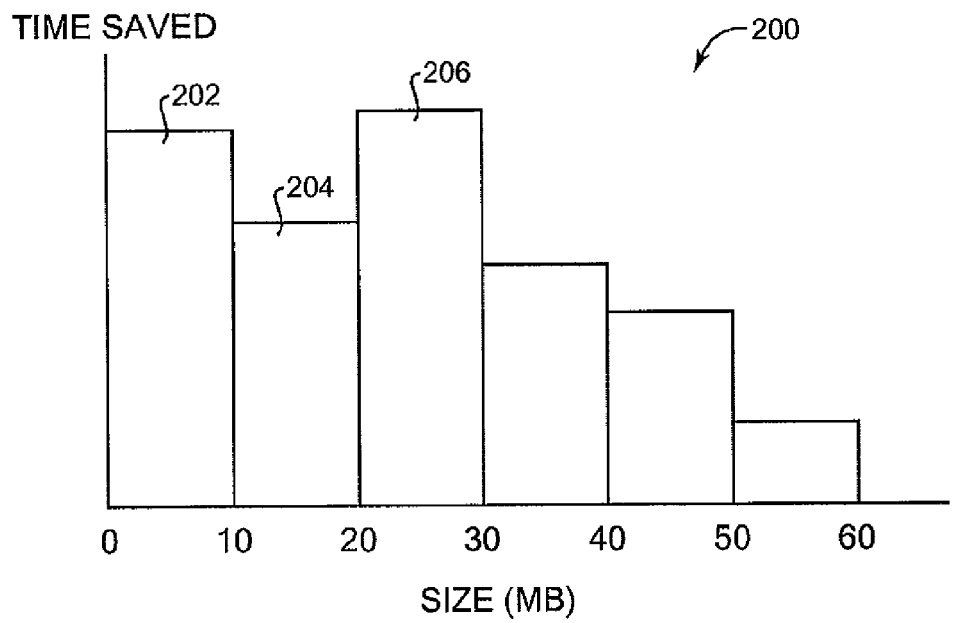
FIGS. 4a and 4b are graphs illustrating examples of histograms which can be used to store and present data points determined by the present invention.

In step 134, the processing time (as determined in step 130) and the larger cache size (as determined in step 132) are stored in memory or other storage for future reference. In some embodiments, every pair of time and size is stored as an individual data point. In other embodiments, an optimization can be used to reduce the storage requirements of the processing time and size data points. For example, each time datapoint can be added to a histogram whose bins represent cache size intervals. FIG. 4a shows one example of such a histogram, described below.

After step 134, the process continues to step 126 where the compiled, executable query is executed as in standard query processing, and the process is complete at step 128.

If a cache hit occurred in step 108 when searching the query cache 50 for the received query, then the process continues to step 136. In step 136, a cache size is determined, this cache size being the minimum size needed to allow the cache hit. This can be performed by summing the size of all query objects 54 in the cache 50, which are newer or equal in age to the query object 54 that matched the received query. The size of each query object 54 can be stored in the query cache 50 and retrieved in this step, or, alternatively, the size of the query object 54 computed on the fly during this step. For example, the query objects 54 can be traversed and ordered based on their time stamps indicating when the query object 54 was stored in the cache 50, and the newest queries' sizes added to the total sum of sizes. In alternate embodiments, a more approximate measure of the minimum cache size can be estimated by maintaining a running average size of query object 54 stored in the query cache 50, keeping a count of the number of objects 54 in the query cache 50, and summing the average size for the appropriate number of query objects 54. This average size approximation can also be performed for step 132; for example, the increase in cache size needed to avoid the cache miss can be the average query object size multiplied by the number of objects in the simulation area which have an identification number 62 less than or equal to the identification number 62 of the matching token 58.

In step 138, the minimum cache size determined in step 136, and the processing time taken to originally compile (or otherwise obtain) the received query, are stored in memory or other storage for future reference. The time taken to originally compile the received query is retrieved from the query object 54 in the cache 50 (this time value was stored in the cache 50 in the query object 54 at time of compilation). This data indicates the minimum cache size needed to not incur the associated time cost data point (that time indicating the time to compile the query statement). If the cache 50 is reduced below this minimum cache size, then the time to compile is the time cost.

Figure 4B:
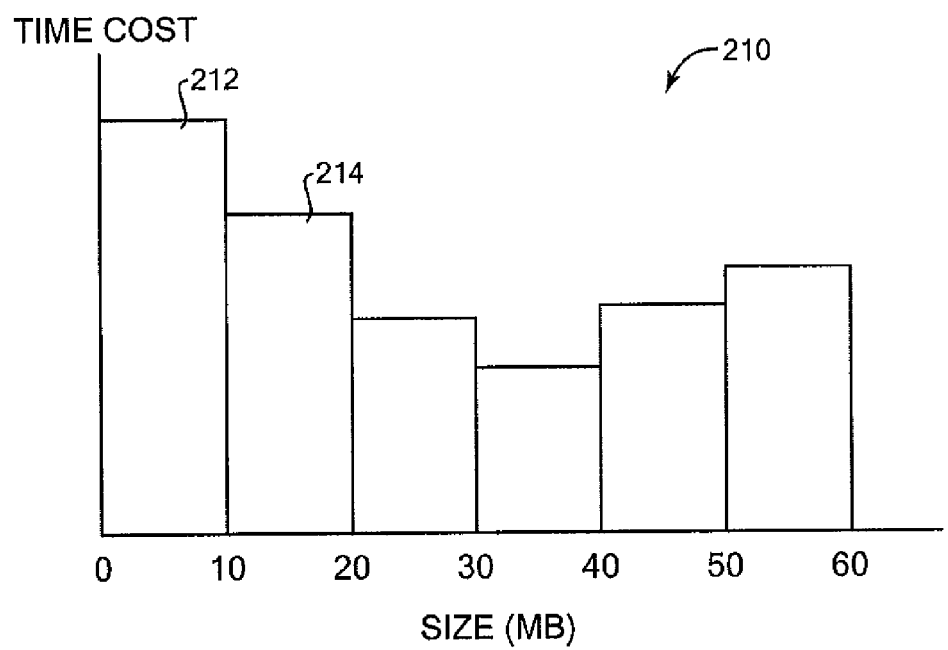

In some embodiments, every pair of time and cache size is stored as an individual data point. In other embodiments, an optimization can be used to reduce the storage requirements of the time and size data points. For example, each time datapoint can be added to a histogram whose bins represent cache size intervals. FIG. 4b shows one example of such a histogram, described below.

After step 138, the process continues to step 126 where the compiled, executable query is executed as in standard query processing, and the process is complete at 128.

It should be noted that steps 136-138 are optional. In some embodiments, only the size and time data points determined from steps 130 and 132 are stored and used for tuning query cache 50 size (in such an embodiment, the processing time of compilation of a query may not need to be stored in the query cache 50, since it will not be needed for the step 138). Thus, only the data points for time saved when increasing the cache size would be available. However, in many embodiments, for small amounts of cache size changes, an estimate of the time cost for decreasing the query cache size by a certain amount can be approximated as the same as the equivalent time savings for increasing the query cache size by the same amount.

FIG. 4a is a graph illustrating an example of a histogram 200 of the present invention for storing and presenting data points determined by steps 130-134 of the process of FIG. 3. Histogram 200 has a horizontal axis representing cache size, and a vertical axis representing processing time saved for the cache sizes. Time and size data points are aggregated by the histogram.

Over time, as queries are received and the query cache 50 is used, the histogram is filled with a number of data points resulting from multiple iterations of the steps 130-134 of the process of FIG. 3. The histogram can be used to assist the determination of the consequences of resizes of the query cache 50. In example histogram 200, each bucket along the horizontal axis represents a size increase of 10 megabytes over the current cache size (buckets can be other sizes in other histogram embodiments). When storing a time and size data point determined by steps 130 and 132, the time from step 130 is added to the time saved value of the bucket corresponding to the cache size determined in step 132. Thus, each bucket includes a count or sum of all the time saved that would occur if the query cache 50 were increased in size by an amount in the range of cache sizes represented by that bucket.

The processing time saved for a desired cache size tuning adjustment can be determined from the histogram by summing the time values for the appropriate histogram buckets for the amount of increase to the desired size. For example, if the current query cache size is 20 megabytes, and it is desired to know how much time is saved by increasing the cache size to 50 megabytes, then it is an increase of 30 megabytes, and the histogram buckets representing 0-10, 10-20, and 20-30 megabytes (buckets 202, 204, and 206) are selected and the time saved values of these buckets is summed to find the total time saved.

In some embodiments, histogram data (or other stored data) can be reset to zero or shifted when any update of the cache size is implemented. This is because some of the stored data of the histogram is related to the old cache size and will no longer be pertinent to the new query cache size. For example, if the query cache size is increased by 10 megabytes, then the whole histogram can be reset to zero; or in other embodiments the pertinent buckets of the histogram can be zeroed and the remaining buckets shifted, e.g., the 10-20 megabyte bucket can become the 0-10 megabyte bucket.

FIG. 4b is a graph illustrating an example of a histogram 210 of the present invention for storing and presenting data points determined by steps 136 and 138 of the process of FIG. 3. Histogram 210 has a horizontal axis representing cache sizes, and a vertical axis representing the processing time cost if the cache 50 were reduced in size below the different minimum cache sizes. Time and size data points are aggregated by the histogram.

Over time, as the query cache 50 is used, the histogram is filled with a number of data points resulting from steps 136 and 138 of the process of FIG. 3. The histogram can be used to assist the determination of the consequences of resizes of the query cache 50. In histogram 210, each bucket along the horizontal axis represents a size decrease of 10 megabytes under the current cache size. When storing a time and size data point determined by steps 136 and 138, the time from step 138 is added to the time value of the bucket corresponding to the cache size determined in step 136. Thus, each bucket includes a count or sum of all the time cost that would be incurred if the query cache 50 were reduced in size by an amount in the range of cache sizes represented by that bucket.

The time cost for a cache size decrease can be determined from the histogram by summing the time values for the appropriate histogram buckets for the amount of size decrease from the current size. For example, if the current query cache size is 30 megabytes, and it is desired to know how much time is cost by decreasing the cache size to 10 megabytes, then the amount of decrease is 20 megabytes, and the histogram buckets representing 0-10 and 10-20 megabytes (buckets 212 and 214) are selected and the time values of these buckets is summed to find the total time cost (it should be noted that the "time cost" value is actually a negative value in histogram 210).

The present invention advantageously allows cost model data for a query cache 50 to be provided for use in tuning the size of a query cache 50. This cost model data can be useful for an administrator of the system who is tuning the query cache size to achieve a more optimal performance of the database system by showing the time cost for any desired change in size of the query cache 50, i.e., how beneficial it is to add memory to the query cache 50, and how costly it is to take memory away from the query cache 50. The present invention is able to provide accurate cost model data based on the actual operation of the database system, rather than projected operation.

The cost model data can also be used in an automatic system that can self-tune cache sizes. Typically, there are several different memory areas used in a database system, each memory area used for a different purpose, such as the query cache, a data page cache, etc. Each of the memory areas may be in use concurrently and therefore in competition for memory. Since each of the memory areas uses memory in different ways, it can be difficult to decide which memory area is most in need of memory.

The cost model data of the present invention can be used in an automatic system that looks at all the different memory areas and caches with different cost models and makes adjustments to different caches based on total time costs and overall performance. For example, a query cache cost model of the present invention can be used with a data page cache cost model for a data page cache of the database system. If the query cache model suggests that 5 seconds may be saved if 10 megabytes of memory are added to the query cache, and the data page cache cost model suggests that only 1 second is lost if 10 megabytes of memory are taken from the data page cache, then the automated system can decide to give the query cache 50 the 10 megabytes from the data page cache, for a net gain of 4 seconds less processing time. One example of a cost model for data page memory tuning is described in U.S. Pat. No. 6,961,835, which describes a cost model for data page memory tuning which uses a simulation area that can also be used for the simulation area 52 of the query cache cost model of the present invention.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing cost data for tuning a size of a query cache in a database system, the method comprising:
receiving a query;
checking a query cache to determine whether a stored query matches the received query; and in response to a cache miss occurring due to no stored query matching the received query:

generating a token from the received query, wherein the token represents the received query and checking whether the generated token matches a token stored in a simulation area of storage, wherein a plurality of tokens are stored in the simulation area of storage, each of the tokens representing a query object that was previously evicted from the query cache, determining a processing time saved by an avoidance of the cache miss, and determining a cache size needed to avoid the cache miss, wherein the determining of the cache size needed to avoid the cache miss is performed only when the generated token matches a token stored in the simulation area of storage, wherein the cache size needed to avoid the cache miss is determined by summing sizes of all the query objects represented by the tokens stored in the simulation area of storage, wherein the summed query objects are a same age or older than the query object represented by the matching token, wherein each token stored in the simulation area of storage is included in a stub that also includes the size of the query object represented by the token, and an identification number indicating an order in which the token was stored in the simulation area of storage.

2. The method of claim 1 further comprising compiling the received query and storing the compiled executable query in the query cache.

3. The method of claim 2 further comprising:
in response to the query cache already full, evicting a query object from the query cache so that the compiled executable query is stored in the query cache; and
creating a token representing the evicted query object, and storing the created token in the simulation area of storage.

4. The method of claim 2 wherein a time required to compile the received query is used as the processing time saved.

5. The method of claim 1 further comprising, in response to a cache hit occurring due to finding a stored query in the query cache that matches the received query, determining a minimum cache size needed to allow the cache hit and a processing time cost when the minimum cache size is not met.

6. The method of claim 1 further comprising storing the cache size and the processing time as data points for each received query when the cache miss occurs, such that the processing time saved is determined for any desired query cache size by consulting the data points.

7. The method of claim 6 wherein the data points are stored as a histogram.

8. A computer program product comprising a computer readable medium including program instructions for providing cost data for tuning a size of a query cache in a database system and implemented by a computer system, the program instructions for:

receiving a query;

checking a query cache to determine whether a stored query matches the received query; and in response to a cache miss occurring due to no stored query matching the received query:

generating a token from the received query, wherein the token represents the received query and checking whether the generated token matches a token stored in a simulation area of storage, wherein a plurality of tokens are stored in the simulation area of storage, each of the tokens representing a query object that was previously evicted from the query cache, determining a processing time saved by an avoidance of the cache miss, and determining a cache size needed to avoid the cache miss, wherein the determining of the cache size needed to avoid the cache miss is performed only when the generated token matches a token stored in the simulation area of storage, wherein the cache size needed to avoid the cache miss is determined by summing sizes of all the query objects represented by the tokens stored in the simulation area of storage, wherein the summed query objects are a same age or older than the query object represented by the matching token, wherein each token stored in the simulation area of storage is included in a stub that also includes the size of the query object represented by the token, and an identification number indicating an order in which the token was stored in the simulation area of storage.

9. The computer program product of claim 8 further comprising program instructions for:
in response to the query cache already full, evicting a query object from the query cache so that a compiled executable query is stored in the query cache;
creating a token representing the evicted query object, and storing the created token in the simulation area of storage; and
compiling the received query and storing the compiled executable query in the query cache.

10. The computer program product of claim 8 further comprising program instructions for, in response to a cache hit occurring due to finding a stored query in the query cache that matches the received query, determining a minimum cache size needed to allow the cache hit and a processing time cost when the minimum cache size is not met.

11. The computer program product of claim 8 further comprising program instructions for storing the cache size and the processing time as data points for each received query when the cache miss occurs, such that the processing time saved is determined for any desired query cache size by consulting the data points.

12. A system for providing cost data for tuning a size of a query cache in a database system, the system comprising:
a query cache provided in memory of the database system;
a simulation area of storage provided in the memory of the database system; and
at least one processor in communication with the query cache and the simulation area of storage, the at least one processor operative to check the query cache to determine whether a stored query matches a received query,
in response to a cache miss occurring due to no stored query matching the received query, the at least one processor:
generating a token from the received query, wherein the token represents the received query and checking whether the generated token matches a token stored in the simulation area of storage, wherein a plurality of tokens are stored in the simulation area of storage, each of the tokens representing a query object that was previously evicted from the query cache,
determining a processing time saved by an avoidance of the cache miss, and
determining a cache size needed to avoid the cache miss, wherein the determining of the cache size needed to avoid the cache miss is performed only when the generated token matches a token stored in the simulation area of storage, wherein the cache size needed to avoid the cache miss is determined by summing sizes of all the query objects represented by the tokens stored in the simulation area of storage, wherein the summed query objects are a same age or older than the query object represented by the matching token, wherein each token stored in the simulation area of storage is included in a stub that also includes the size of the query object represented by the token, and an identification number indicating an order in which the token was stored in the simulation area of storage.

* * * * *